United States Patent [19]
Simmering et al.

[11] Patent Number: 5,428,813
[45] Date of Patent: Jun. 27, 1995

[54] SPECIAL FUNCTION MICRO CONTROLLER INTEGRATED CIRCUIT PROGRAMMED TO SELECTIVELY PERFORM ONE OF AT LEAST TWO DIFFERENT AND UNRELATED FUNCTIONS

[75] Inventors: Marlin V. Simmering, Wendell; William Y. Barkley, Raleigh, both of N.C.

[73] Assignee: Alcatel Network Systems, Inc., Richardson, Tex.

[21] Appl. No.: 290,679

[22] Filed: Aug. 15, 1994

Related U.S. Application Data

[63] Continuation of Ser. No. 713,727, Jun. 11, 1991, abandoned.

[51] Int. Cl.⁶ .................................................. G06F 9/40
[52] U.S. Cl. ............................. 395/800; 364/DIG. 1; 364/DIG. 2; 364/222.2; 364/222.3; 364/232.8; 364/919; 364/919.4; 364/925.6
[58] Field of Search ............... 364/DIG. 1 MS File, 364/DIG. 2 MS File; 395/200, 250, 275, 325, 375, 700, 775, 800; 371/5.1

[56] References Cited

U.S. PATENT DOCUMENTS

| | | | |
|---|---|---|---|
| 4,626,985 | 12/1986 | Briggs | 395/800 |
| 4,626,986 | 12/1986 | Mori | 395/700 |
| 4,841,561 | 6/1989 | Hill | 379/97 |

*Primary Examiner*—Robert B. Harrell
*Attorney, Agent, or Firm*—Ware, Fressola, Van Der Sluys & Adolphson

[57] ABSTRACT

To maximize the usefulness of micro controllers, a single micro controller is programmed to selectively perform multiple functions based on code segments stored within the micro controller, so that a single programmed micro controller may be used to perform one of a number of different tasks depending upon where the micro controller is used. A pin of the micro controller is adapted to receive a logical signal to which the code responds and selects the function to be performed by the micro controller. The programming of a micro controller to perform multiple functions takes advantage of the full capacity of the micro controller and reduces the numbers of micro controllers that must be inventoried to satisfy the required functions.

12 Claims, 11 Drawing Sheets

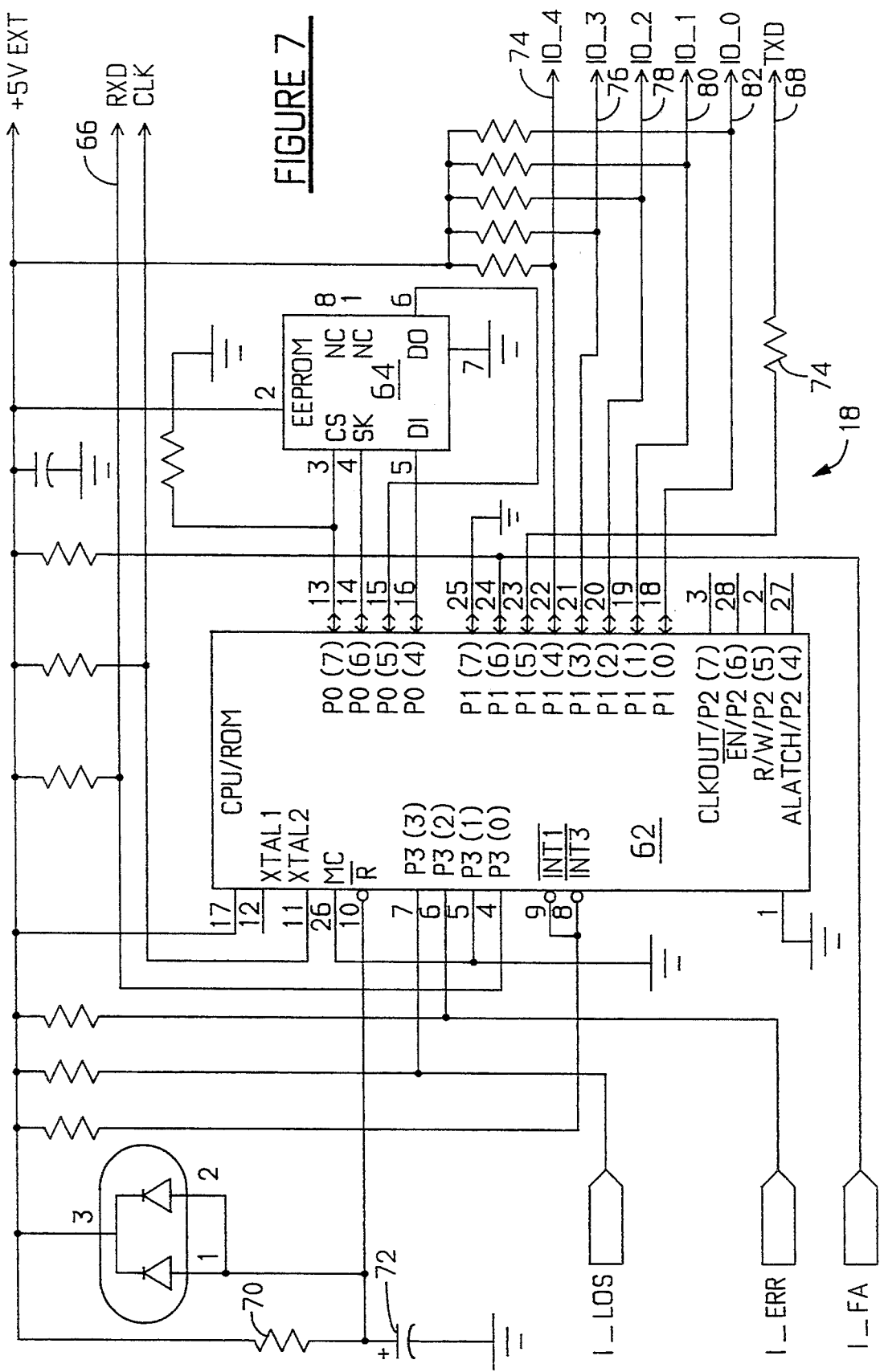

1

SPECIAL FUNCTION MICRO CONTROLLER INTEGRATED CIRCUIT PROGRAMMED TO SELECTIVELY PERFORM ONE OF AT LEAST TWO DIFFERENT AND UNRELATED FUNCTIONS

This is a continuation application of application Ser. No. 07/713,727, filed on Jun. 11, 1991 and which is now abandoned.

BACKGROUND OF THE INVENTION

1. Field of the Invention

The present invention relates to multiple function micro controllers and, more particularly, to apparatus for using such micro controllers in printed circuit board assemblies for telecommunication systems.

2. Description of the Prior Art

Modern telecommunications systems operate under the principle of distributed control, with many control functions being implemented by a host of distributed micro controllers. The micro controllers are generally located on printed circuit board assemblies dispersed throughout the telecommunications system. Many of the individual functions performed by the micro controllers are not overly complex; and as a result, most micro controllers have excess capability over that needed for the particular function being performed.

Due to the vast numbers of micro controllers utilized in a telecommunications system, it has become necessary to pre-program micro controllers for each particular application and function. This created a significant problem, in that a large number of differently programmed micro controllers had to be stockpiled in inventory, each having different identifications and part numbers.

Due to the large number of micro controllers used in the telephone systems, it is beneficial if only one type or only a few types of micro controllers are utilized throughout the system, thereby providing for volume discounts when the micro controllers are purchased.

Thus, the need for many different types of micro controllers, each programmed in a different manner, resulted in increased equipment cost and excessive inventory cost.

SUMMARY OF THE INVENTION

The present invention contemplates the use of a single type of micro controller programmed to perform many different functions needed in a telephone system, thereby reducing the number of different types of micro controllers that are needed in the system. The present invention further contemplates the programming of a single micro controller to selectively perform multiple functions based on code segments stored within the micro controller. Thus, a single programmed micro controller may be used to perform one of a number of different tasks, depending upon the particular printed circuit board assembly on which it is installed and the logic level provided to a function selection pin. In this manner, the full capacity of the micro controller may be fully used, by loading the micro controller ROM with different code segments to selectively perform one of many different functions.

The present invention may be advantageously used in several different applications; however, the invention will be described as being uniquely relevant to a telecommunications application. In the described embodiment, a micro controller is programmed to function as a low-speed serial link interface and as a T1 line bit error rate counter.

An objective of the present invention is to make efficient use of micro controllers.

Another objective of the present invention is to provide a micro controller with multiple selectable programmed functions.

Another objective of the present invention is to provide a micro controller programmed to perform the functions of a low-speed serial link interface transmitter/receiver and a T1 line bit error rate counter.

Another objective of the present invention is to reduce the micro controller cost by using large quantities of the same micro controller.

Another objective of the present invention is to reduce the number of types of micro controllers that must be inventoried.

DESCRIPTION OF THE DRAWINGS

FIG. 7 is a schematic diagram of another portion of the block diagram of FIG. 3, which utilizes a micro controller to implement a low-speed serial link interface function for communicating over the bus of FIG. 2.

DETAILED DESCRIPTION OF THE PREFERRED EMBODIMENT

Figure 1:
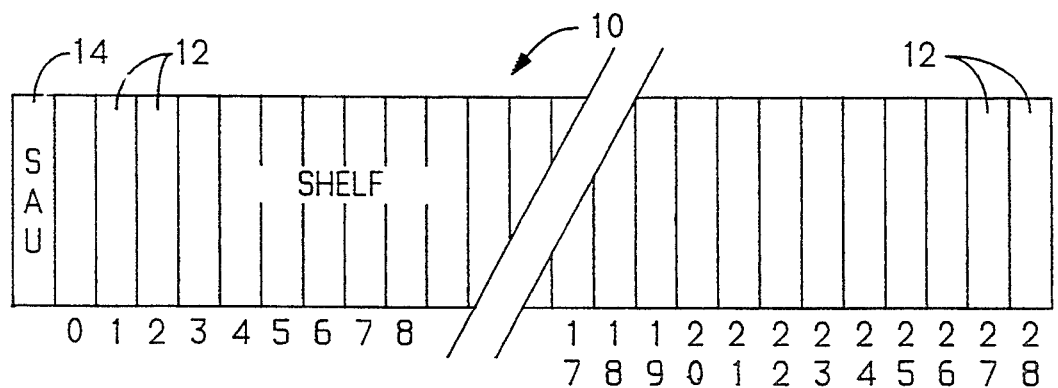
FIG. 1 is a schematic illustration of an equipment shelf for printed circuit board assemblies (PBAs).

Referring to FIG. 1, there is shown schematically an equipment shelf 10 having addressable slots for receiving slave PBAs 12. The slave PBAs 12 are at least in part controlled by a master PBA 14. In the described embodiment, the master PBA is a System Alarm Unit (SAU), and the slave PBA is a Central Office Repeater (COR). Each PBA slot in the shelf may be identified by a particular physical address, which may be represented by a binary number. The number of slots is arbitrary and may vary, depending upon a particular application.

Figure 2:
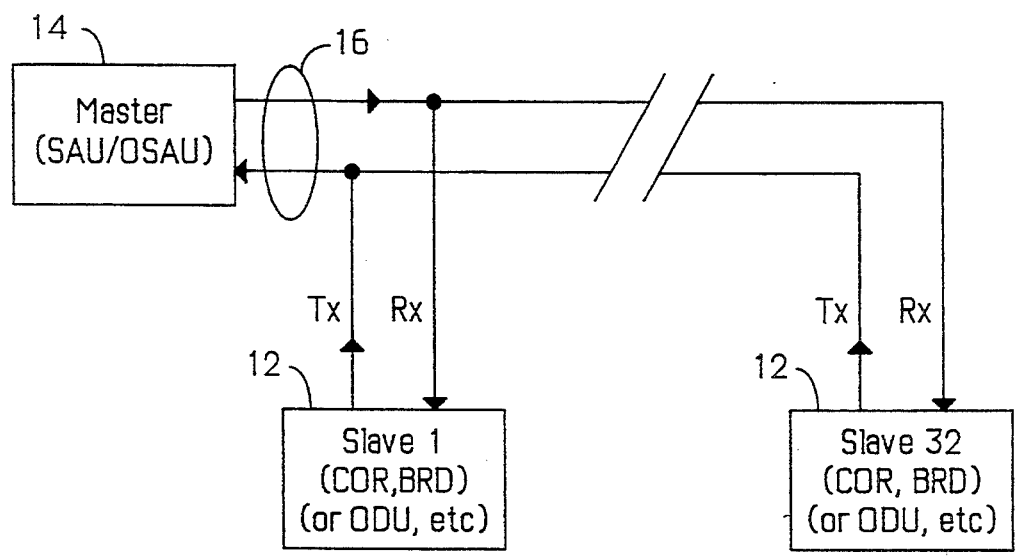
FIG. 2 is a block diagram showing a bus topology which may be used in the shelf of FIG. 1.

There is, however, a need to communicate between the master PBA 14 and the various slave PBAs 12. This communication is facilitated through the use of a low-speed serial link interface (LSSLI), as illustrated in FIG. 2, where the master PBA 14 is connected to the slave PBAs 12 through the use of a bi-directional bus 16. The LSSLI is a multi-drop link that transfers data between the master 14 and up to a maximum of 32 slaves 12. The bus operates in a byte synchronous/bit asynchronous mode, at 32 Kbit/s. Two lines, one for transmit and one for receive, carry data between the master and slaves. The master retrieves data by sending commands to the slaves and then waits for a response. A slave may transmit information only after receiving a request from the master.

Since all transmit outputs are multipled, only one slave at a time is allowed to drive the bus. Prior to the start and after the end of a transmission, the addressed slave sets its transmit output to a high impedance state. All other unaddressed slaves must set their transmit output to a high impedance state also. To assure that the bus remains in a high impedance state when all slaves are tri-stated, the master pulls the bus to logic high.

As previously mentioned, the bus operates in a byte synchronous/bit asynchronous mode, meaning that each word is individually synchronized, but each bit within the word is captured asynchronously. This synchronization technique requires the transmitter and receiver clocks only to be accurate enough to reliably clock in one data word, since re-sync will occur for each subsequent word. This allows flexibility in the number of words that may be contiguously strung together to form broader transmission bursts without requiring increased clock accuracy.

In the embodiment used to illustrate the present invention. The master PBA 14 provides a distributed clock to all slave PBAs sourced by the master. Since all transmitters and receivers are clocked by the same source, the effects of jitter and drift are virtually eliminated. The nominal frequency of the distributed clock is 4.096 MHz.

Each slave PBA 12 is identified by a five-bit binary address corresponding to a slot location on the shelf. Backplane address pins are wired to apply a logic 0 or a logic 1 to the various address terminals of each slave PBA, such that an incremental binary address is presented on the address pins for the sequential slots in the shelf 10. This procedure requires that all address terminals on the PBA be pulled high by the appropriate application of a positive voltage potential.

Figure 3:
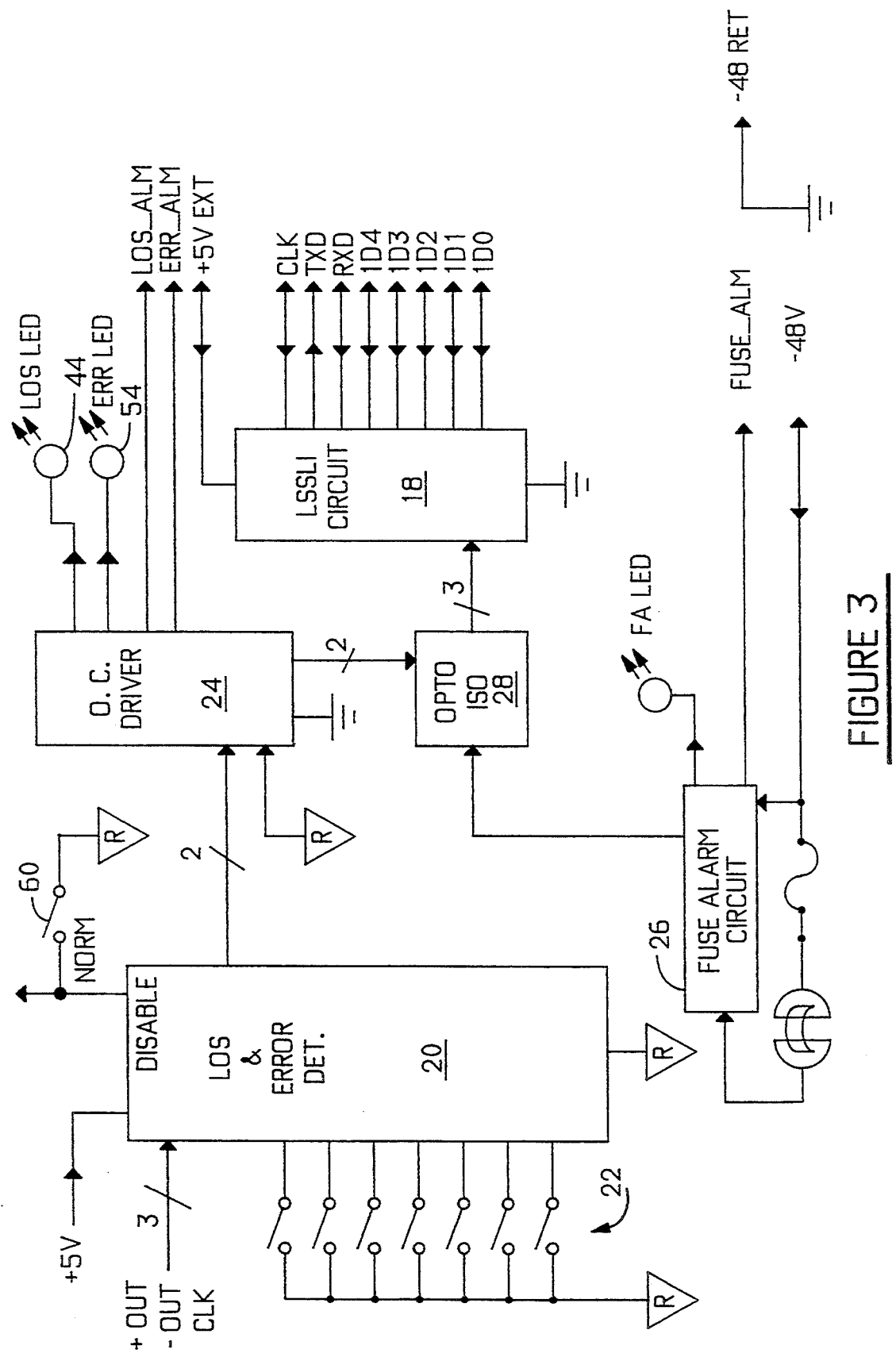
FIG. 3 is a block diagram showing a portion of a PBA which may be used in the shelf of FIG. 1.

Referring to FIG. 3, there is shown a partial block diagram of components of a slave PBA which functions as a COR. The COR includes an LSSLI circuit 18, which is directly connected to the bus 16 by transmit and receive lines TXD and RXD respectively. The LSSLI 18 also receives +5 V power, a clock signal CLK, and input from five address terminals 1D0 to 1D4. A Loss of Signal (LOS) and error (ERR) detector circuit 20 is provided to generate LOS and ERR alarms in response to either a loss of signal or detection of a number of errors above a selected threshold on a T1 line. Circuit 20 receives +OUT, −OUT and CLK signals derived from a T1 line. The error detection threshold is selected by a multiple contact switch 22, the contacts of which are selectively closed to establish an error threshold level and to select the type of error to be detected. Circuit 20 also outputs a disable signal to disable the COR in the event of an ERR alarm. A switch 60 is provided to bypass the disable signal. An open collector driver circuit 24 is provided to process the alarm signals and provide open collector outputs for LOS-ALM and ERR-ALM alarms and to drive LEDs for visual LOS and ERR signal outputs. A fuse alarm circuit 26 generates an alarm when a blown fuse is detected and drives an LED for a visual fuse alarm (FA) and provides an open collector output for a FUSE-ALM alarm. The alarm generated by the fuse alarm circuit and the LOS and ERR alarms are also provided to an optical isolator 28, which provides corresponding signals to the LSSLI 18.

Figure 4:
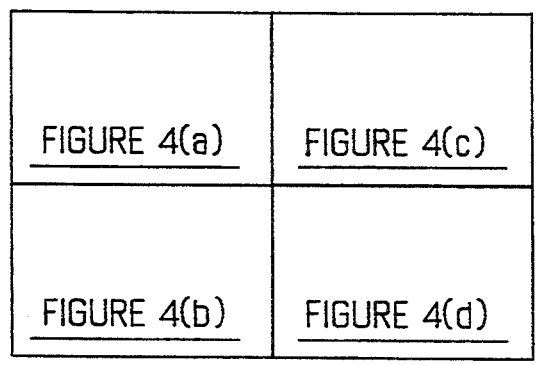
FIG. 4 is an illustration of the relation between FIGS. 4(a), 4(b), 4(c) and 4(d), FIGS. 4(a), 4(b), 4(c) and 4(d) fit together as shown in FIG. 4 to show a schematic diagram of a portion of the block diagram of FIG. 3, which implements a bit error rate counting function and utilizes a micro controller.
Figure 4A:
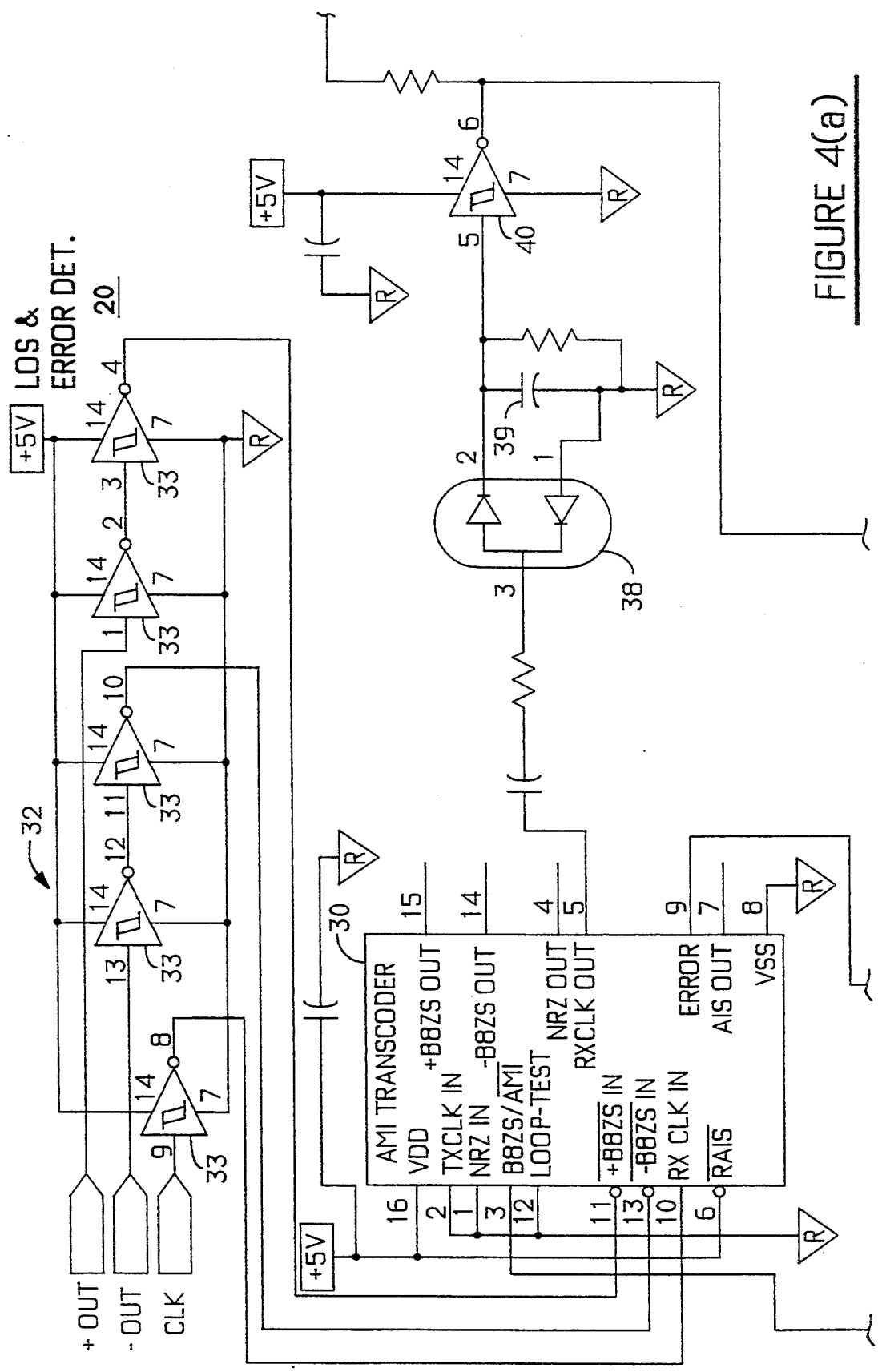

FIG. 4 shows how FIGS. 4(a)–(d) fit together to show the detailed circuitry of the LOS and ERR detector circuit 20, the open collector driver 24 and the optical isolator 28 of FIG. 3. An AMI transcoder 30 receives CLK, +OUT and −OUT signals derived from a T1 line, after passing through a regenerator circuit 32, including a plurality of buffers 33. The AMI transcoder 30 functions to detect B8ZS or bi-polar violation errors and is an IC similar to the EXAR T5670 AMI transcoder. The AMI transcoder 30 is adapted to detect B8ZS or bipolar violation errors, depending upon the input received at pin 3, which input may be either +5 volts or a reference ground, depending upon the setting of switch 34. Switch 34 shown in FIG. 4(b) comprises one set of contacts of switch 22 shown in FIG. 3. If switch 34 is in the B8ZS position, only errors in the B8ZS code are output as pulses on pin 9. When switch 34 is in the AMI position each sensed bipolar violation causes an output pulse. Pin 9 is connected to a CLK input of a D flip-flop 36. A pulse on pin 9 causes the Q output of the flip-flop to go to a logic 1 state.

The CLK signal is derived from the T1 line data and is provided to the AMI transcoder 30 at pin 10 as an RX CLK IN signal. The AMI transcoder 30 provides an RX CLK OUT signal on pin 5, which is used to drive a rectifier circuit 38. As long as there is a signal present on the T1 line, a clock signal will be provided on the output pin 5 of AMI transcoder 30. The clock signal rectified at 38 provides a high level to the input of an inverter 40. When signal is lost, the rectified output on capacitor 39 decreases and the output of the inverter goes high, thereby turning on a transistor 42. Transistor 42 drives LOS LED 44, transistor 46 and optical isolator 48. Transistors 42 and 46 are parts of the open collector driver 24 of FIG. 3, while the optical isolator 48 is part of optical isolator 28 shown in FIG. 3. The collector of transistor 46 provides the LOS-ALM output shown in FIG. 3, while the I-LOS output of the optical isolator provides a signal to the LSSLI circuit 18.

Figure 4B:
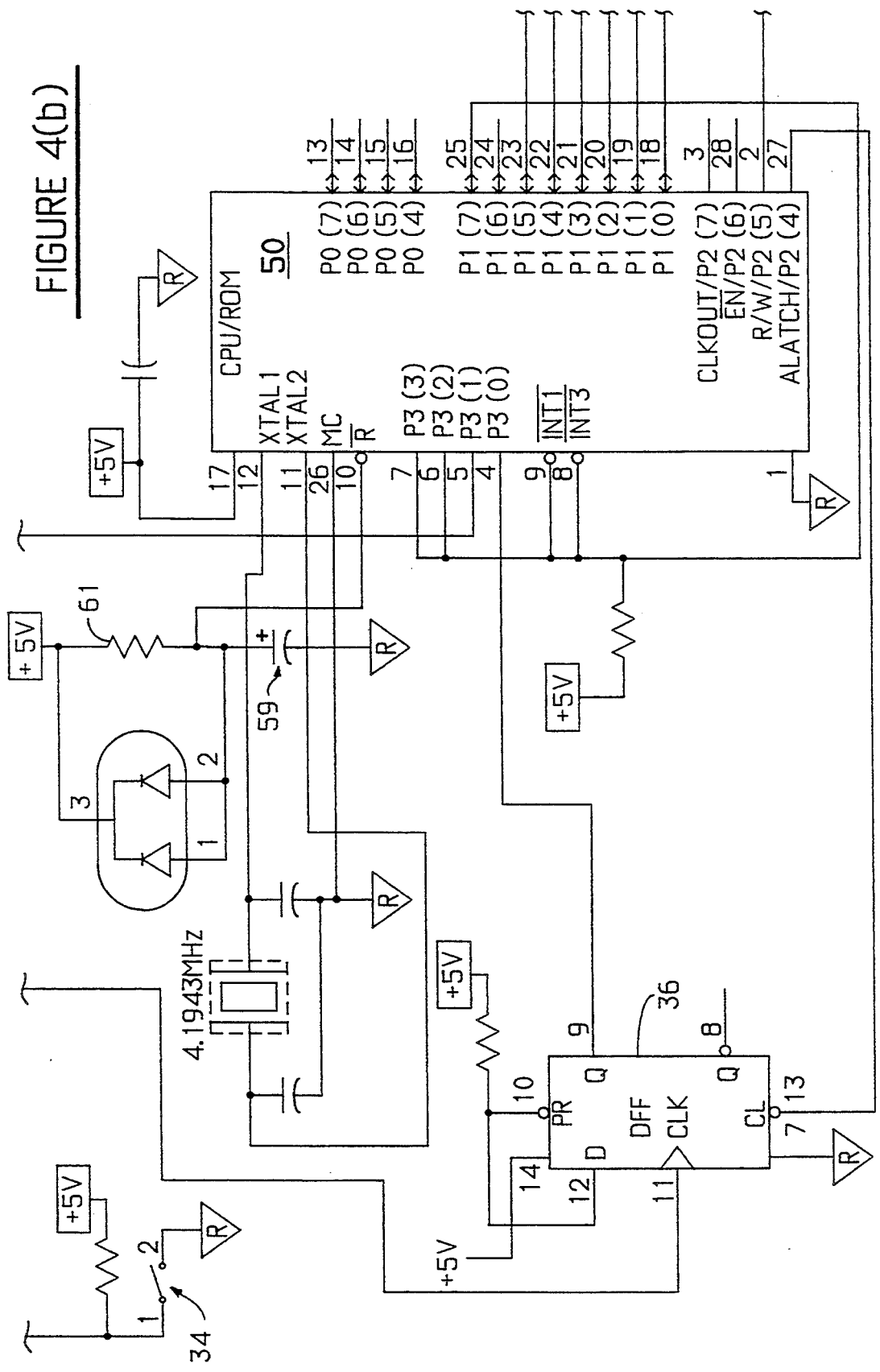
Figure 4C:
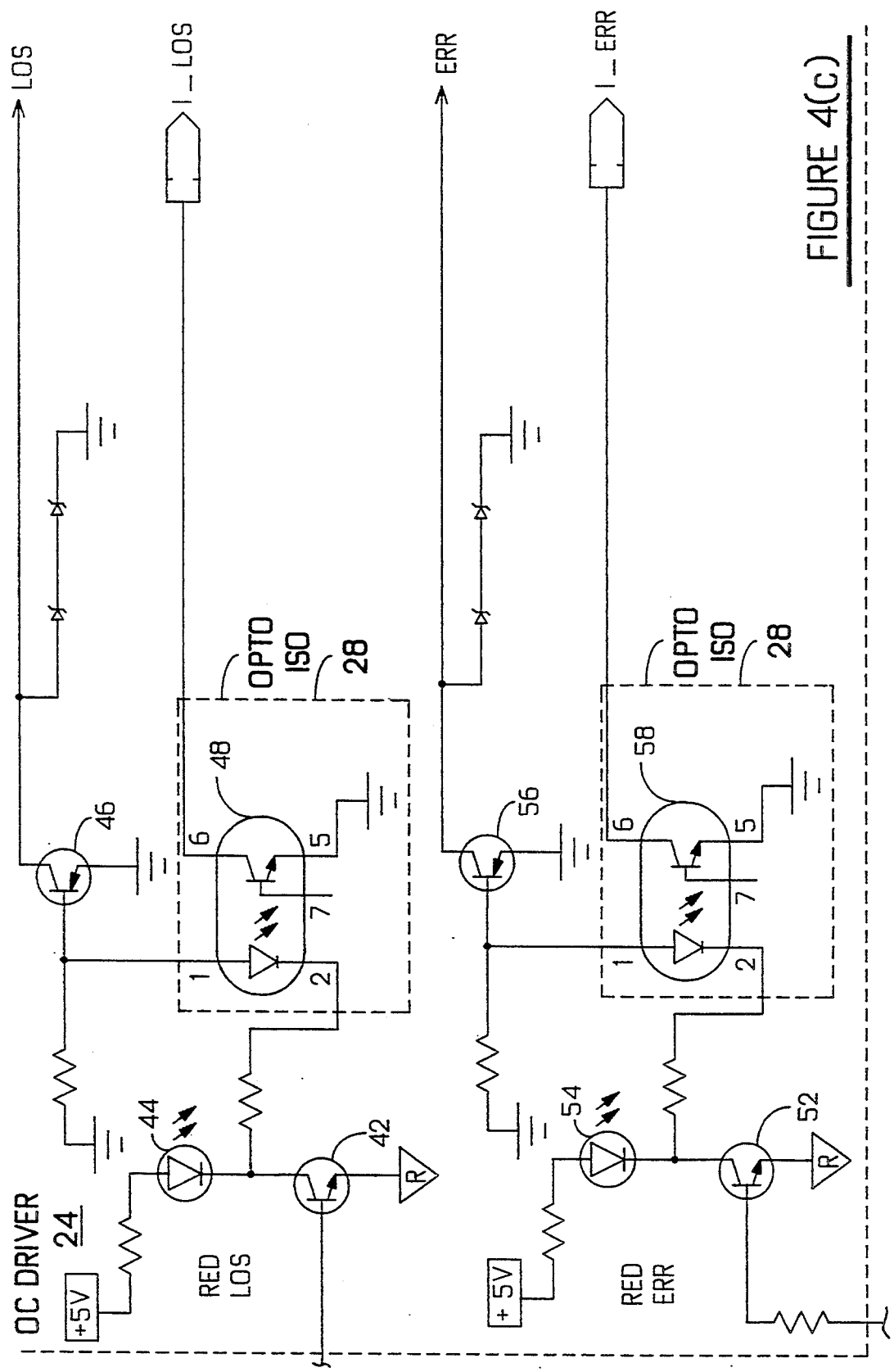

The Q output of flip-flop 36 is connected to a pin 4 of a micro controller 50, which is uniquely programmed to perform one of two programs in accordance with the present invention. The micro controller 50 contains internal ROM programmed to allow it to selectively function as a bit error rate counter or as an LSSLI transceiver. The bit error rate counter function is performed in the circuit of FIGS. 4(a)–(d). The function to be performed by the micro controller is determined by a signal on pin 25 of FIG. 4(b), which is connected to port 1, bit 7. When said pin receives a logic 1 signal, the bit error rate counter function is selected. In FIG. 4(b), pin 25 is connected to receive a +5-volt signal.

When operating as a bit error rate counter, the micro controller counts the error signals received at pin 4 from the Q output of flip-flop 36. When the micro controller counts an error signal received from flip-flop 36, it then functions to clear the flip-flop by providing an output at pin 27, which is connected to a clear input, CL, of the flip-flop, thereby clearing the flip-flop to receive another error signal from the AMI transcoder circuit 30 at its CLK input.

Figure 4D:
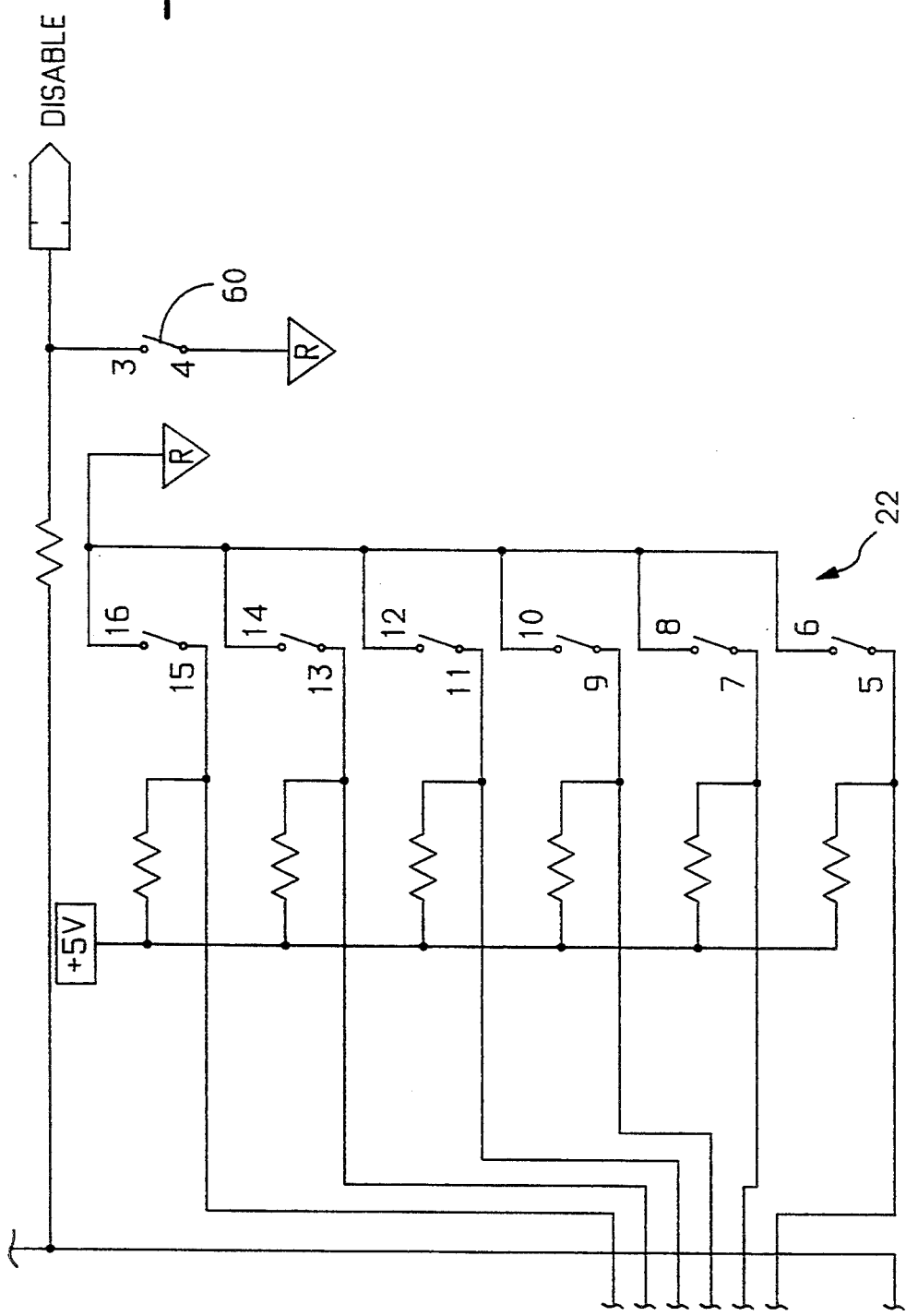

A counter embedded in the micro controller proceeds to count error signals received at pin 4 during a period of time established by the various contacts of switch 22 of FIG. 3, which is also shown in FIG. 4(d). Each set of switch contacts is connected to one of pins 18-23 of the micro controller 50. Each of these pins is connected to a +5-volt supply through a resistor for providing a logic 1 to the pins. The closing of a switch contact of switch 22 causes the respective pin to be driven to a logic 0 by connecting the pin to a ground reference. The settings of switch 22 determine the period of time during which the counter counts errors and therefore essentially sets a predetermined error rate threshold for the micro controller 50. If the predetermined error rate is exceeded, the microprocessor is programmed to output a high on pin 2, which causes transistor 52 to conduct, thereby turning on the ERR LED 54, transistor 56 and an output transistor in an optical isolator 58. The optical isolator 58 is part of optical isolator 28 shown in FIG. 3, while transistors 52 and 56 are part of the open collector driver 24 of FIG. 3. The output of the optical isolator 58 is provided as an input to the LSSLI circuit 18 of FIG. 3.

Pin 2 of the micro controller is also connected to a disable output for disabling the COR on the PBA. A switch 60 is connected from the disable output to a reference ground for grounding the disable output to thereby override the disable signal if desired.

Figure 5:
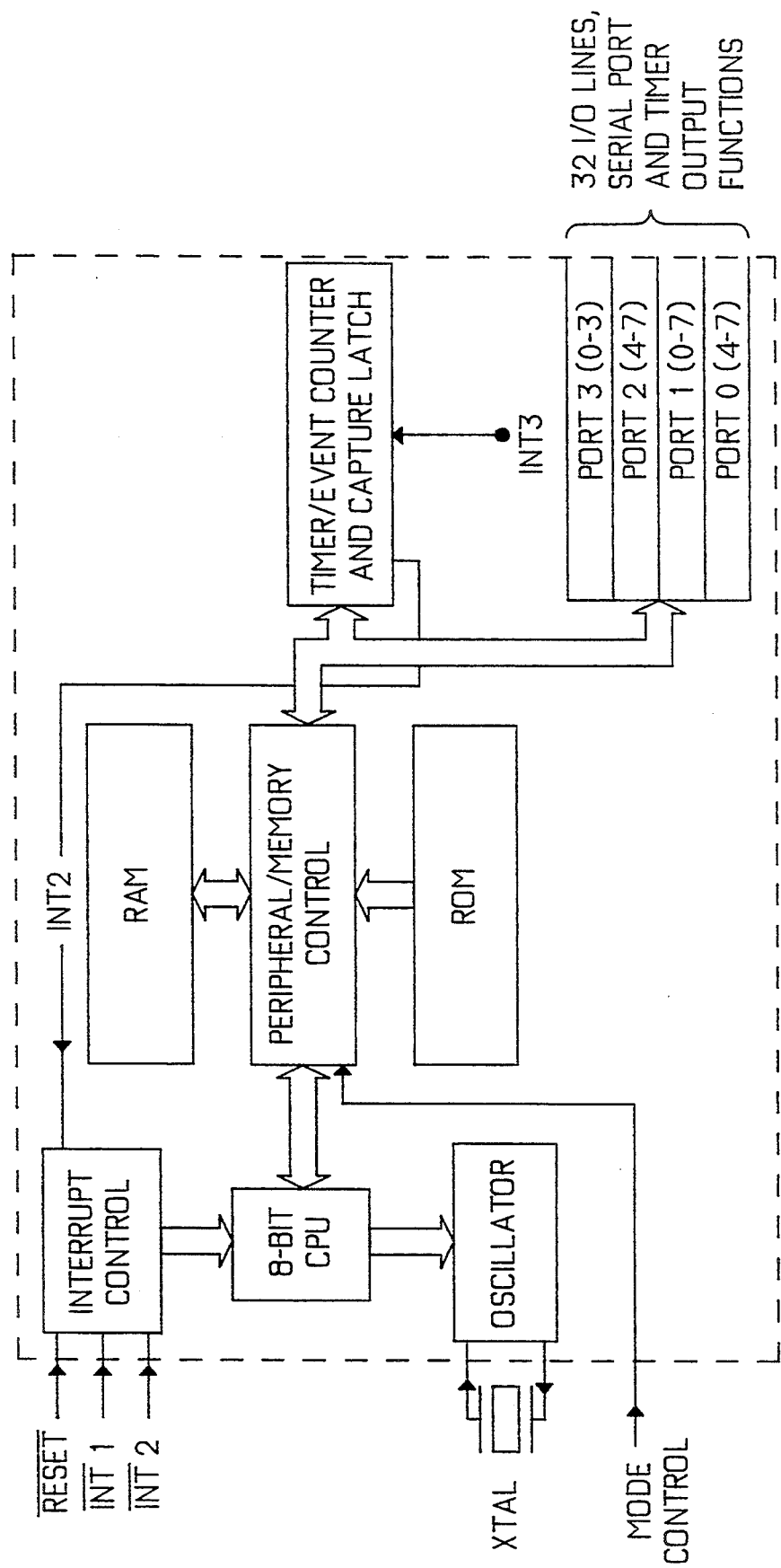
FIG. 5 is block diagram of the micro controller used in the present invention.

The micro controller 50 is a masked read-only memory (ROM) device, specifically, a Texas Instruments Type No. TMS70CT20 Micro Controller. A block diagram of the micro controller is shown in FIG. 5. This particular micro controller contains 128 bytes of random access memory (RAM), 2K bytes of ROM, an 8-bit central processing unit (CPU), an oscillator, an interrupt control, a peripheral/memory control, a 13-bit timer, a bi-directional 8-bit input/output (I/O) port (Port 1), a bi-directional 4-bit I/O port (Port 0), a 4-bit input port (Port 3), a 4-bit output port (Port 2), and busses interconnecting said components. The micro controller is configured in a single chip mode, so that program control is performed via the on-board ROM. The on-board ROM software initializes all RAM, as well as the I/O ports.

Micro controller 50 is provided with a power-on reset input at pin 10. Pin 10 derives its input from a timing circuit comprising a capacitor 59 and a resistor 61 which are connected to the +5 V supply. The timing circuit provides a reset signal to the micro controller if power is lost for a predetermined time.

As previously mentioned, the micro controller 50 has additional capability that is not fully utilized by the bit error rate counter function. In order to more efficiently utilize the micro controller and reduce inventory requirements, the micro controller is programmed to perform multiple different functions. In the present example, in addition to the function of a bit error rate counter, the micro controller is programmed to function as an LSSLI transceiver. The pins associated with the parts of the micro controller will handle different signals for each specific function. Therefore, for each distinctly different function, the micro controller must be connected to the PBA in a manner which will allow it to perform the desired function for the particular PBA in which it is installed. Pin 25 connected to port 1 bit 7 always serves the same purpose, that being micro controller function selection. In FIG. 4(b), pin 25 is provided with a +5 volt signal which represents a logic level 1. Upon power up of the PBA and micro controller, a logic level 1 or 0 is applied to pin 25, and the internally-stored ROM causes the micro controller to read the state of pin 25 whenever power is initially applied to the micro controller. Thus, a similarly programmed micro controller can be used selectively for different functional applications. In the present invention, only two functions are programmed into the micro controller, but additional functions could also be added if capacity exists. In such a case, more pins would be required for function selection.

Figure 6:
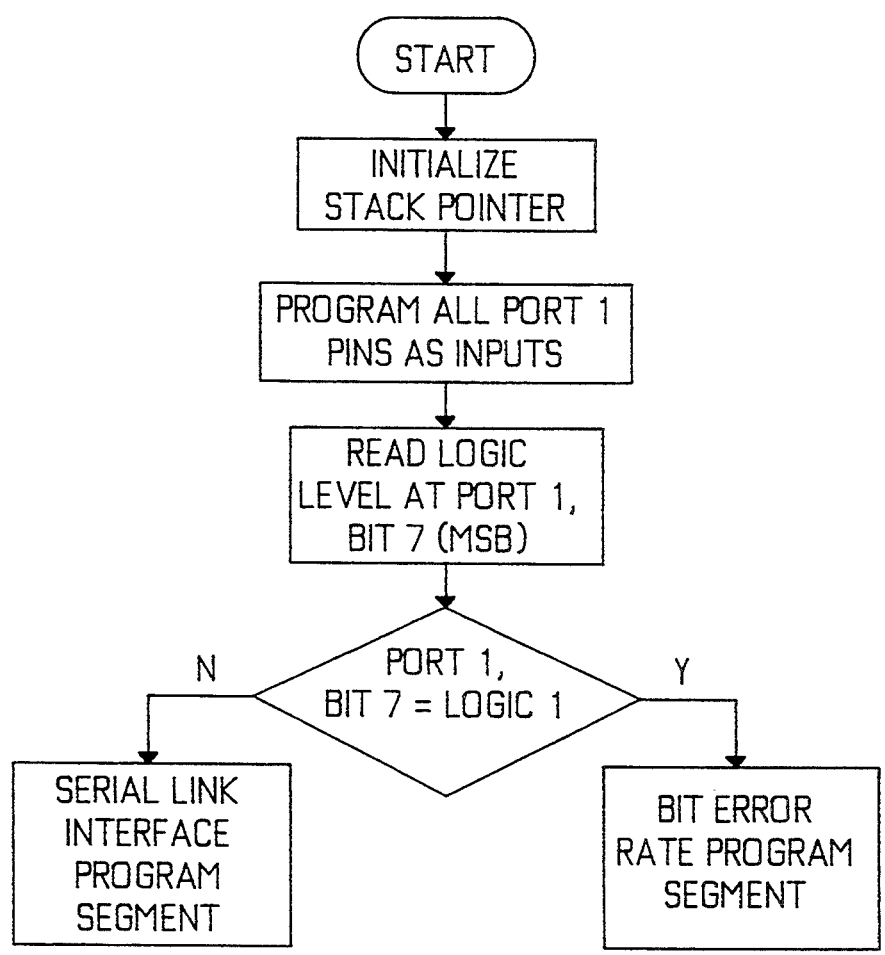
FIG. 6 is a flow chart of initialization code embedded in the micro controller.

Referring to FIG. 6, there is shown a flow chart for the initialization and function selection tasks performed by the code embedded in the ROM. The flow chart illustrates how at startup a stack pointer is initialized and all port 1 pins are programmed as inputs. The input at port 1, bit 7 is then read to determine the function to be performed by the micro controller.

Referring to FIG. 7, the LSSLI circuit 18 is shown comprising a micro controller 62 and an EEPROM 64. The micro controller 62 is identical to the micro controller 50 of FIG. 4(b), having the same code programmed into the ROM. The micro controller 62 functions as a transceiver, and this function is selected by providing a logic level 0 to pin 25 of port 1 bit 7, which is shown as being grounded. The interface 18 functions to interface the slave PBAs 12 with the bus 16 shown in FIG. 2. The interface is connected to a receive line of the bus 16 at a terminal 66 to receive data RXD. RXD data includes commands and addresses from the master PBA 14 which, in the case of the present invention, is a system alarm unit (SAU). A terminal 68 is connected to a transmit line of bus 16 to transmit data, TXD, to the master PBA 14 or SAU. A resistor 74 is connected in series between pin 23 and terminal 68 for the purpose of controlling EMI by slowing the data transition rate. The micro controller 62 and EEPROM 64 are powered by a +5 V source, which is also used to generate a power-on reset signal developed by a timing circuit, comprising a resistor 70 and a capacitor 72, which provides a reset signal to pin 10 of the micro controller 62 after the power has been applied for a predetermined time. Pins 18-22 of the micro controller 62 are connected through resistors to the +5 V source to normally provide a logic level 1 signal to the pins of the micro controller. However, said pins are also connected to terminals 74-82, which are selectively connected to ground at the particular slot of the shelf 10 to provide a binary address for the PBA 12 inserted into the particular slot.

The LSSLI circuit is adapted to receive various alarm signals, such as the I-LOS, I-ERR, and I-FA signals from the optical isolator 28. The I-LOS signal is provided to pin 7 of the micro controller 62 and is used to drive the pin to a logic level 0 when the LOS signal is present. The I-ERR signal is provided to pin 6 of the micro controller 62 and is used to drive pin 6 to logic level 0 when an error signal is provided. The I-FA signal is connected to pin 24 and is also used to drive the pin to a logic level 0 to indicate the presence of a fuse alarm.

The LSSLI circuit 18 functions as a transceiver for receiving and transmitting information to the master PBA 14 along the bus 16. In the embodiment used to describe the present invention, the master PBA 14 is a system alarm unit (SAU) which performs an alarm retrieval function. When performing such a function, the micro controller 62 receives command data from the SAU on the RXD lead, which is connected to pin 4. The ROM program may read or write from or to the EEPROM 64 via pins 13-16 of the micro controller 62. The EEPROM 64 functions in a manner similar to that of the EEPROM disclosed in U.S. patent application Ser. No. 07/616,175, filed Nov. 20, 1990, now U.S. Pat. No. 5,267,309 and commonly assigned herewith. The EEPROM 64 is a 9346 type device, such as the ICT93646 or the National Semiconductor NMC9346E devices. The EEPROM has the capability of storing 128 bytes, each with eight bits, for a total storage capacity of 64 words of 16 bits each.

After a command from the SAU including an address is received from the RXD line at terminal 66, the EEPROM is read or written, and any requested data stored within the EEPROM is returned to the SAU on the TXD lead at terminal 68. The command received on the RXD line includes an address. The micro controller compares the address with the address it read from pins 18-22. If the addresses compare, the micro controller knows whether it is being addressed and whether it should respond. The micro controller then reads the command and knows what the next action should be, such as reading alarm bits present at pins 6 and 7, or reading status information from the EEPROM.

The power-on reset is controlled by resistor 70 and capacitor 72, which form a timing network. The timing of this network is required only to power-up the micro controller in a graceful manner, the absolute time constant is not critical. The reset input to the micro controller will cause the micro controller to reset any time it is pulled low for longer than a time period of approximately one microsecond, when the micro controller is operated from a 4.0 MHz clock frequency. The micro controller transmits and receives data in a byte synchronous/bit asynchronous mode at 32 Kbit/s.

All of the inputs to the LSSLI circuit that are connected to edge fingers of the PBA are pulled to +5 V to prevent noise or floating state changes from occurring when the SAU is absent. A chip select input (CS) at pin 3 of the EEPROM 64 is pulled to ground level to ensure that noise on this pin during card insertion or extraction does not enable the EEPROM, possibly causing accidental writes or erasure.

After power-up, the micro controller continuously samples the RXD line for a high-to-low transition. Upon detection of such a transition, the device will then begin to clock in data and capture it in an internal buffer memory. The received data, if valid, will contain address information. The micro controller compares this address data to the data at the address inputs connected to terminals 74-82, which are first read during the power-on initialization sequence, to determine if the particular micro controller is being addressed.

In order for the master PBA 14 to communicate with the slave PBAs 12 over the bus 16, a protocol has been established, wherein the basic unit of information is the word. Each word is composed of 11 bits, the first of which is a start bit, the next eight bits being data bits, the tenth bit being an address/data bit, and the eleventh bit being a stop bit. Thus, the start bit is the first bit sent and the stop bit is the last. The start bit always begins as a transition from logic 1 to logic 0 and remains low for the entire bit period, as shown in Table I. The data bits follow the start bit, and the tenth (address) bit may be high or low, depending upon whether the word contains address or data information. The last (stop) bit is always a logic level 1, which marks the end of the word and readies the bus for the next start bit transition.

TABLE I

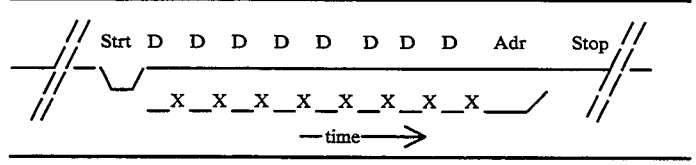

The next higher hierarchical level of information is the frame. A frame is composed of six words, as shown in Table II. The first word in the frame is an address word, and in the address word the address bit is set to a logic level 1. In all subsequent words in the frame, the address bit is set to logic 0. All words within a frame are transmitted contiguously. The last word in the frame is the checksum word. The checksum ensures the integrity of the received data.

TABLE II

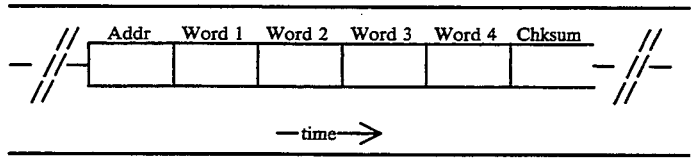

Prior to a transmission by the master PBA 14, the checksum is calculated and then sent as the last word in the frame. Upon receipt of the transmission by the slave PBA 12, the checksum is again calculated and compared to the received checksum to determine if an error has occurred. When a slave PBA 12 transmits to the master, this process is repeated in reverse order.

Normally communication is initiated by the master PBA sending a command frame to a slave PBA. The slave PBA then responds by returning a response frame to the master PBA within a predefined time period. The master PBA is prevented from sending another transmission until either a response frame is received from the slave PBA or a timeout period expires. As a further precaution, the master PBA is allowed to transmit the command frame only a predetermined maximum number of times. The timeout period and the maximum number of times a command may be sent is device-dependent and may vary from PBA to PBA. In general, most PBAs use a timeout period of 60 msec and a maximum number of attempts equal to 3.

In situations where a history-based response is required from a slave PBA, the maximum number of command tries must be limited to one. This is required to prevent the transmission of corrupted data to the master PBA. An example of such a history-based response would be a response to a command such as: increment counter and send its value; or, send register contents and clear register. In each of these cases, if the slave PBA were to respond twice, the data transmitted to the master on the second response would be corrupted.

The ROM of the micro controller is programmed to perform the above-described functions and to communicate using the described protocol. The actual format of the command words in a command frame and the response words in a response frame can be structured in any manner, and thus will not be described herein.

Figure 8:
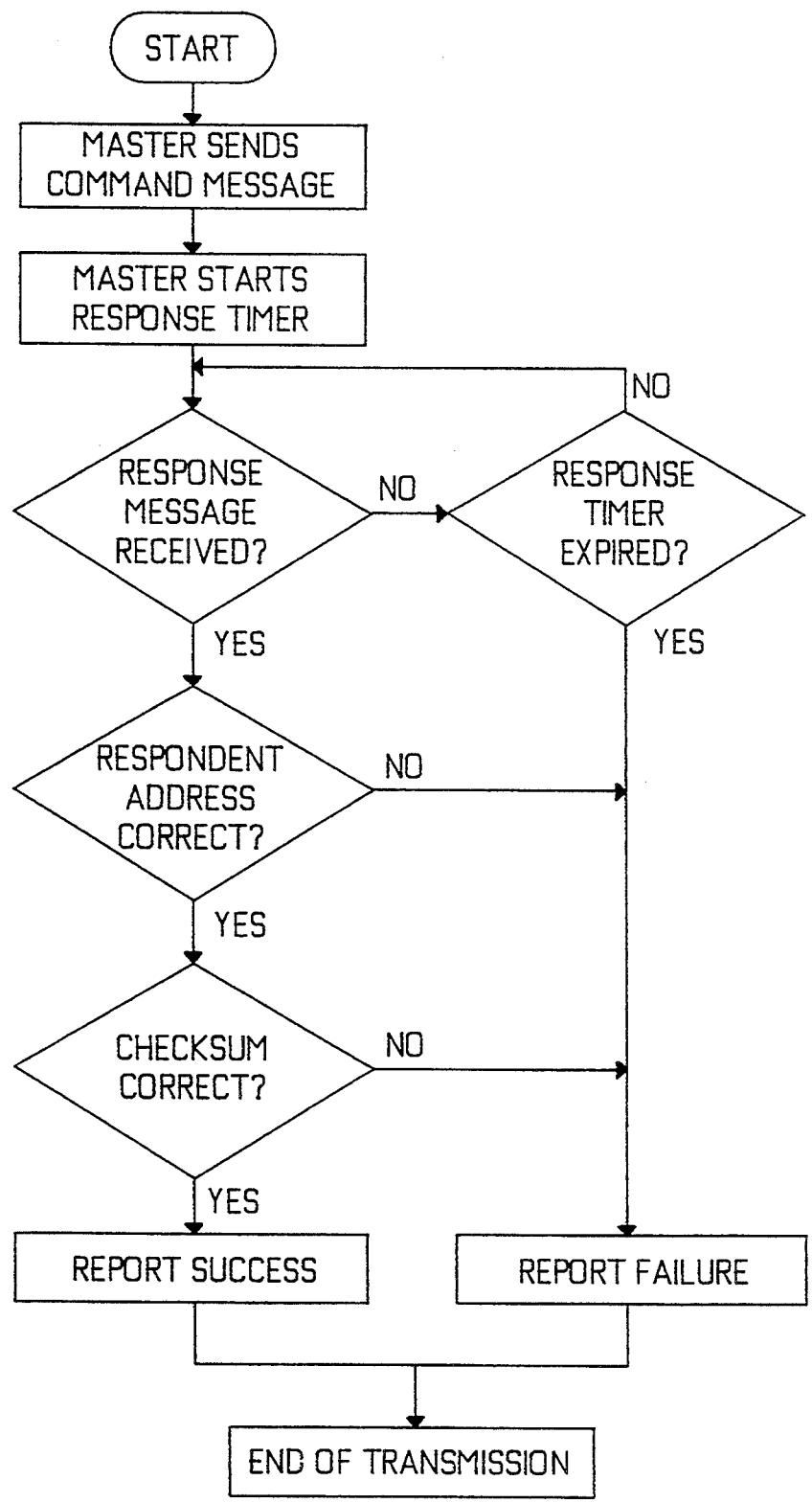
FIG. 8 is a flow chart of code implemented in a master PBA.
Figure 9:
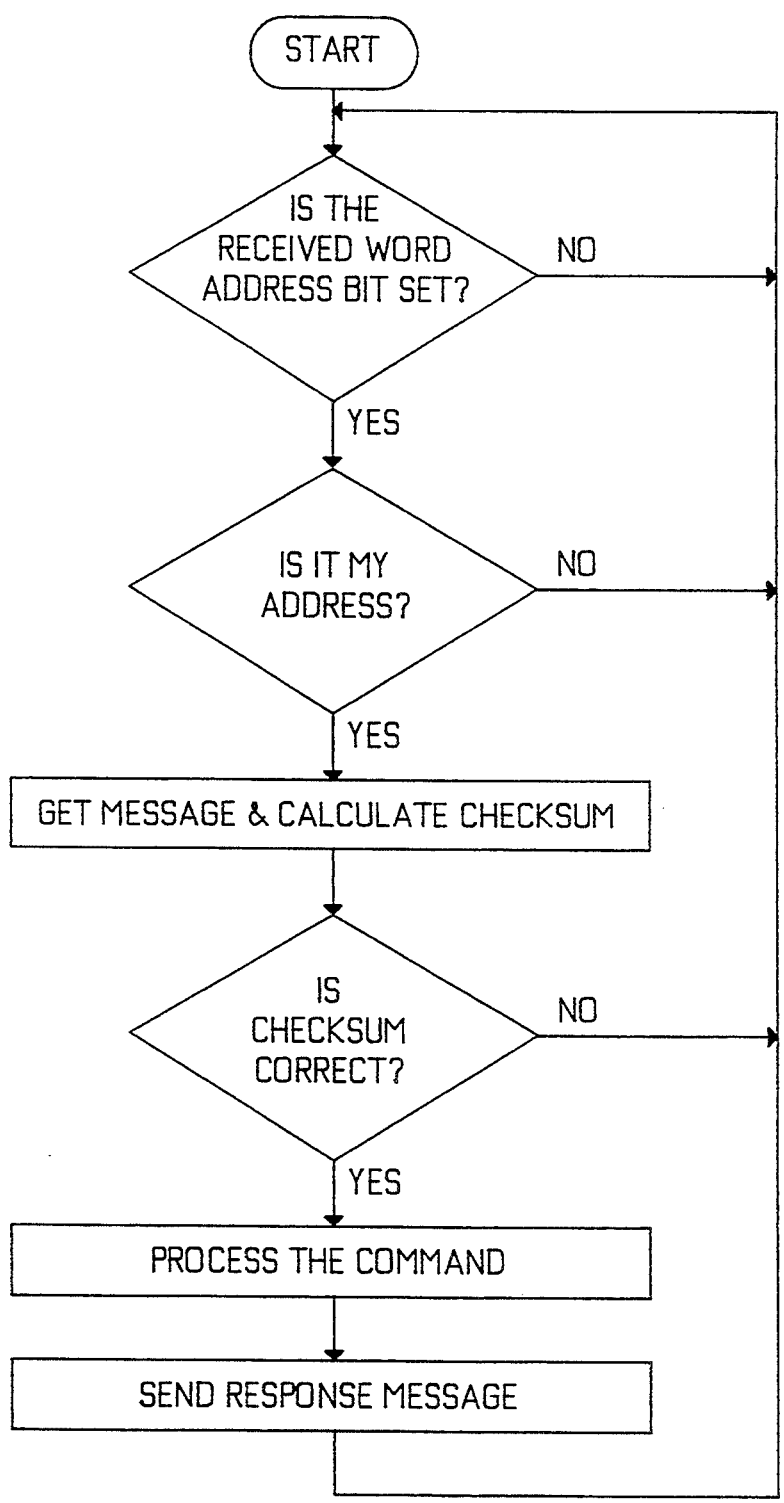
FIG. 9 is a flow chart of code implemented in a slave PBA.

FIG. 8 is a flow chart illustrating the software implemented in the master PBA 14 for the transmission of commands. FIG. 9 is a flow chart illustrating the software implemented in a slave PBA 12 for initiating a response.

Thus, the LSSLI transceiver is implemented using an economical micro controller provided with software tailored to implement the LSSLI protocol for any slave PBA connected to a bus. The software can perform read/write operations to the EEPROM via I/O port 0. The transceiver implements the following functions, including: 1) providing read access to any of the EEPROM address locations; 2) providing write access to any EEPROM location using a guarded protocol; 3) retrieving three alarm/status bits; and 4) providing a software restart command. The master PBA may communicate over the bus with any slave PBA using the transceiver, according to the established protocol.

After power-up or reset, the transceiver initializes based on its ROM code and then continuously looks for a low-going start bit. Whenever a low-going transition is detected, a frame capture routine is initiated which is designed to clock in an entire frame. As the frame is received, the transceiver checks each word for proper start and stop bits, in real time. If at any time in the frame a start or stop bit error is detected, the frame capture routine is aborted, and no response is returned. After receiving a frame with valid start and stop bits, a post-processing routine converts the data to parallel format and checks all words for valid address/data bits. Again, if an error in any address/data bit is detected, the procedure is aborted, and no response is returned. Next, the received address word is compared to the slot address read at power-up. If the addresses do not match, the procedure is aborted and no response is returned. Subsequently, the checksum is calculated and compared to the received checksum; and if the checksums do not match the procedure is aborted, and no response is returned. Finally, the value of the received command byte is read to determine which command processing routine is to be executed.

Thus, the present invention teaches the use of micro controllers programmed to selectively perform one of a multiple number of functions. In the illustrated embodiment, the micro controllers 50 and 62 each include the same software; but said software is segmented, and only portions are implemented, depending upon the logic level appearing at pin 25 of the micro controller. Thus, the micro controller may be selected to perform a line bit error rate counter or may alternatively be used to perform a LSSLI transceiver function for interfacing slave PBAs with a master PBA. It is to be understood that the invention is not limited to these two functions, but rather the micro controller may be programmed to perform other combinations of functions.

By uniquely providing micro controllers with multiple program segments, inventory requirements may be greatly reduced, since one type of programmed micro controller can be used to perform a plurality of selectable functions, thereby eliminating the need for inventorying separate types of micro controllers for each individual function. By using the same micro controller for many different applications, advantage may be taken of quantity discounts, since the same micro controller is utilized numerous times. Thus, the present invention makes efficient use of micro controllers by using their full capacity.

What is claimed is:

1. A printed circuit board assembly comprising:
   one or more mass-produced printed circuit boards having selected components; and
   a programmed special function micro controller integrated circuit connected to said selected components, comprising:
   a plurality of input and output ports;
   random access memory;
   read only memory;
   a central processing unit; and
   bus means connecting said ports, random access memory, read only memory and central processing unit, said read only memory providing program control and having embedded therein code segments for performing at least two different and unrelated application program functions, said programmed special function micro controller integrated circuit being responsive to a signal on one of said input ports to selectively initiate a code segment for performing one of said at least two different and unrelated application program functions, wherein said programmed special function micro controller integrated circuit is mounted to said one or more mass-produced printed circuit boards, and wherein said components are selected from among at least two different and unrelated groups of components for correspondingly selecting and performing said at least one of said at least two different and unrelated application program functions in conjunction with said programmed special function micro controller integrated circuit.

2. A printed circuit board assembly including a programmed special function micro controller integrated circuit as described in claim 1, wherein said programmed special function micro controller integrated circuit additionally includes a timer, and one of said functions is bit error rate counting, said programmed special function micro controller integrated circuit having a port connected to said one or more mass-produced printed circuit boards to receive error signals, a plurality of ports connected to switches on said one or more mass-produced printed circuit boards which may be set to select a predetermined time period during which received error signals are counted, said programmed special function micro controller integrated circuit being responsive to the number of error signals counted during the predetermined time period to initiate an error alarm when a predetermined error signal rate threshold is exceeded.

3. A printed circuit board assembly including a programmed special function micro controller integrated circuit as described in claim 2, wherein the error signals received by the programmed special function micro controller integrated circuit are received from a transcoder device which senses pulses transmitted over a telephone transmission line and detects pulse errors and outputs said error signals in response to said pulse errors.

4. A printed circuit board assembly including a programmed special function micro controller integrated circuit as described in claim 3, wherein the transcoder device includes means for causing said transcoder device to detect errors of a type selected from B8ZS code errors and bipolar violations.

5. A printed circuit board assembly including a programmed special function micro controller integrated circuit as described in claim 4, wherein the output of the transcoder device is connected to a clock input of a D-type flip-flop and a Q output of the D-type flip-flop is connected to the port of the programmed special function micro controller integrated device receiving said error signals, said programmed special function micro controller integrated device counts an error each time the Q output goes to a logic level 1 state and thereafter the programmed special function micro controller integrated circuit provides an output to a clear input of the D-type flip-flop to reset said D-type flip-flop.

6. A printed circuit board assembly including a programmed special function micro controller integrated circuit as described in claim 2, wherein said programmed special function micro controller integrated circuit additionally provides a disable signal when the error threshold is exceeded.

7. A printed circuit board assembly including a programmed special function micro controller integrated circuit as described in claim 1, wherein one of said functions is a data link interface function wherein said programmed special function micro controller integrated circuit has ports connected to a bus on said one or more mass-produced printed circuit boards for receiving and transmitting data, ports connected to said one or more mass-produced printed circuit boards for receiving data therefrom, and ports connected to a memory deuce on said one or more mass-produced printed circuit boards, said programmed special function micro controller integrated circuit for receiving commands over said bus and executing said commands by reading data from the ports connected to the one or more mass-produced printed circuit boards and ports connected to the memory device, and transmitting data from the ports connected to said bus, wherein the memory device comprises an EEPROM adapted to store data, said programmed special function micro controller integrated circuit being responsive to received commands to read data from said EEPROM and transmit said data over said bus.

8. A printed circuit board assembly including a programmed special function micro controller integrated circuit as described in claim 7, wherein the data received by the programmed special function micro controller integrated circuit from the one or more mass-produced printed circuit boards contains alarm status information and said programmed special function micro controller integrated circuit reads the alarm status information and transmits the alarm status information over said bus in response to a command received by the programmed special function micro controller integrated circuit.

9. A programmed special function micro controller integrated circuit for being connected to components on one or more mass-produced printed circuit boards for carrying out a selected function, comprising:
 a plurality of input and output ports;
 random access memory;
 read only memory;
 a central processing unit; and
 bus means connecting said ports, random access memory, read only memory and central processing unit, said read only memory providing program control and having embedded therein code segments for performing at least two different and unrelated application program functions, said special function micro controller integrated circuit being responsive to a signal on one of said input ports to selectively initiate a code segment for performing one of said at least two different and unrelated application program functions wherein said components on one or more mass-produced printed circuit boards include at least two different and unrelated groups of components for being connected to said programmed special function micro controller integrated circuit for correspondingly selecting and performing at least one of said at least two different and unrelated application program functions in conjunction with said programmed special function micro controller integrated circuit.

10. A programmed special function micro controller integrated circuit as described in claim 9, wherein said programmed special function micro controller integrated circuit is programmed to perform two different and unrelated telephony application program functions.

11. A programmed special function micro controller integrated circuit as described in claim 10, wherein said programmed special function micro controller integrated circuit additionally includes a timer and wherein said at least two different and unrelated application functions include a bit error rate counter function and a data link interface function.

12. A programmed special function micro controller integrated circuit as described in claim 9, wherein the read only memory is programmed to execute the following steps:
 upon power up, initializing a stack pointer;
 controlling selected ports to be input ports;
 reading a logic level on an input port having a function select signal thereon;
 in response to the logic level of the function select signal, selecting a code segment in the read only memory to be executed; and
 executing said code segment.

* * * * *

UNITED STATES PATENT AND TRADEMARK OFFICE
CERTIFICATE OF CORRECTION

PATENT NO. : 5,428,813
DATED : June 27, 1995
INVENTOR(S) : Simmering et al

It is certified that error appears in the above-indentified patent and that said Letters Patent is hereby corrected as shown below:

At column 11, line 38 (claim 7, line 11), please change "deuce" to --device--.

Signed and Sealed this

Nineteenth Day of September, 1995

Attest:

BRUCE LEHMAN

*Attesting Officer*        *Commissioner of Patents and Trademarks*